Figure 1:
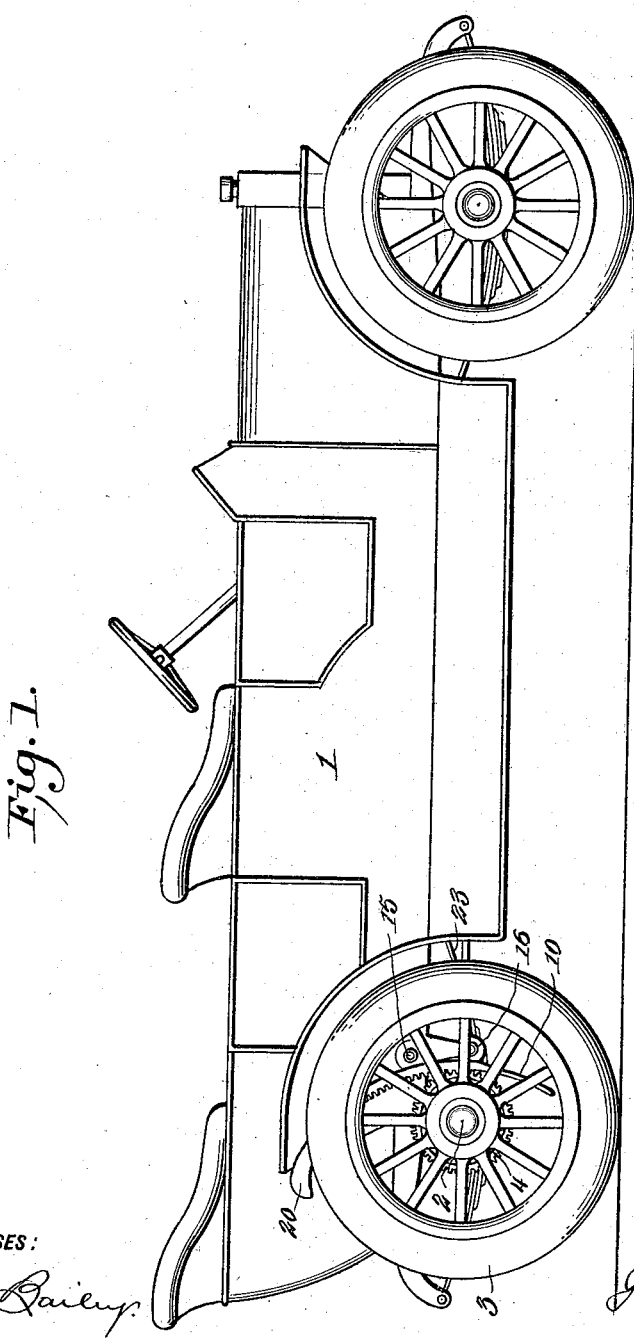

G. W. CASSIL.
EMERGENCY BRAKE.
APPLICATION FILED MAY 6, 1913. RENEWED SEPT. 10, 1915.

1,188,413.

Patented June 27, 1916.
4 SHEETS—SHEET 2.

WITNESSES:

INVENTOR
George W. Cassil,
BY
his ATTORNEY

G. W. CASSIL.
EMERGENCY BRAKE.
APPLICATION FILED MAY 6, 1913. RENEWED SEPT. 10, 1915.

1,188,413.  
Patented June 27, 1916.  
4 SHEETS—SHEET 3.

WITNESSES:

INVENTOR
George W. Cassil,
BY
his ATTORNEY

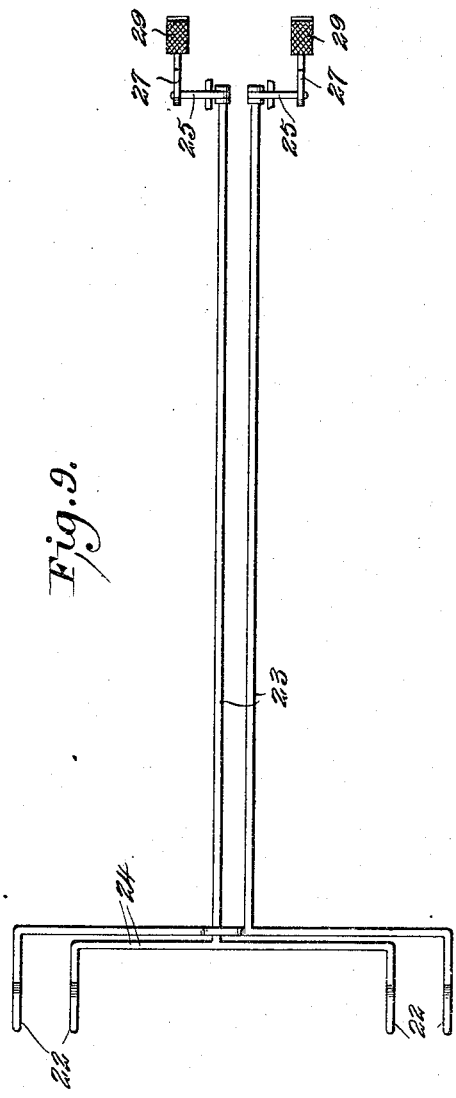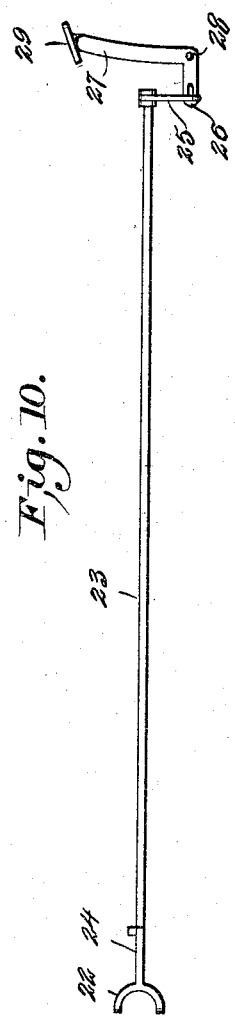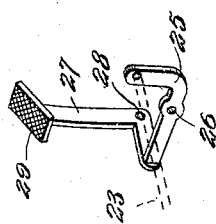

UNITED STATES PATENT OFFICE.

GEORGE W. CASSIL, OF SATANTA, KANSAS.

EMERGENCY-BRAKE.

1,188,413.  Specification of Letters Patent.  Patented June 27, 1916.

Application filed May 6, 1913, Serial No. 765,829.  Renewed September 10, 1915.  Serial No. 50,109.

*To all whom it may concern:*

Be it known that I, GEORGE W. CASSIL, a citizen of the United States, residing at Satanta, in the county of Haskel and State of Kansas, have invented certain new and useful Improvements in Emergency-Brakes, of which the following is a specification.

This invention relates to an improved vehicle emergency brake particularly adapted for use in connection with motor vehicles of various types, and has primarily for its object the provision of an emergency brake for automobiles wherein a suitable brake shoe or runner is arranged adjacent to and operated by the running gear of the machine for throwing or operating the brake to quickly stop the vehicle when traveling in a forward direction, yet permitting the wheels of the machine to rotate so that very little, if any, shock is imparted to the wheels or running gear of the vehicle, but the momentum thereof is entirely halted.

A further object of the invention contemplates the provision of a pair of specially devised brake shoes or runners adapted to be suspended from the rear axle of the vehicle, and to be lowered into contact with the ground so as to elevate the rear end of the machine and the rear wheels thereof free from the ground or road over which the machine is traveling, further forward movement of the machine being immediately checked.

The invention still further resides in the provision of suitable gear mechanism arranged adjacent to and operated by the driven mechanism of the machine, the said gear wheel mechanism adapted to simultaneously operate the brake shoes or runners by the manipulation of suitable levers employed in connection with the invention, the operation of the levers from the driver's seat adapted to operate novel and peculiar clutch mechanism for actuating the brake shoes and applying the emergency brakes as above set forth.

The above and additional objects are accomplished by such means as are illustrated in the preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 2:
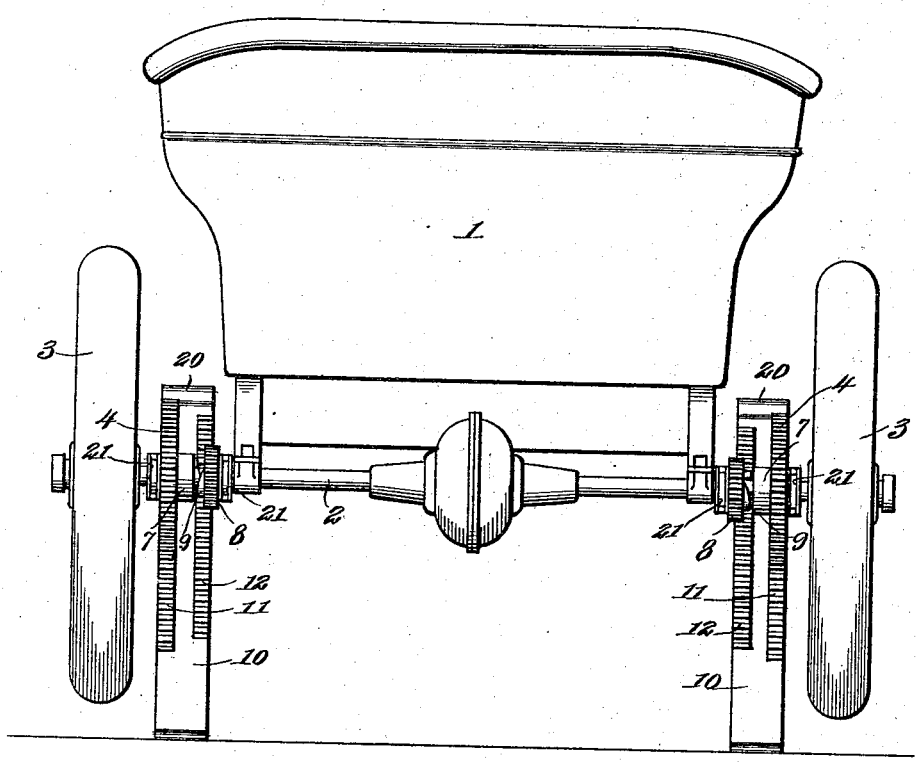
Figure 3:
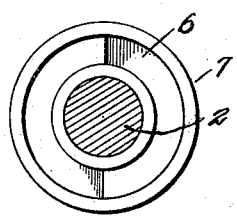
Figure 4:
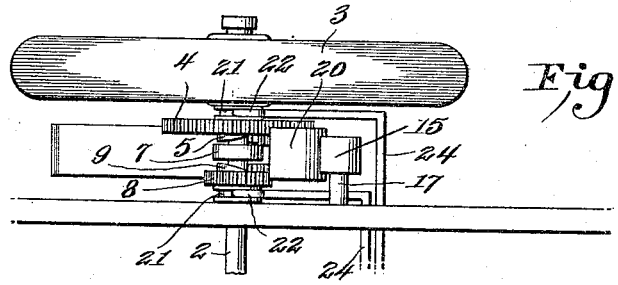
Figure 5:
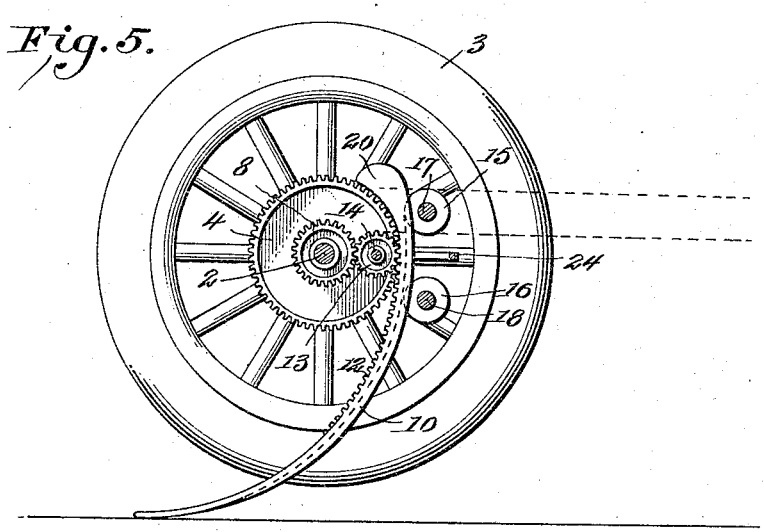
Figure 6:
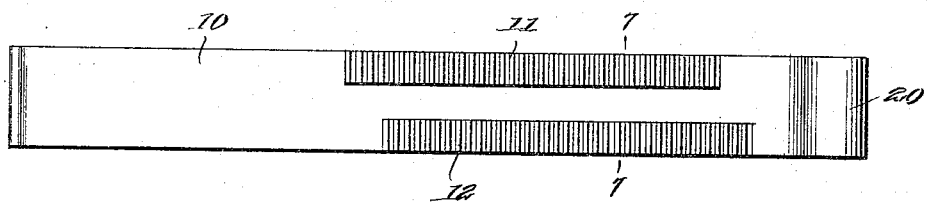
Figure 7:
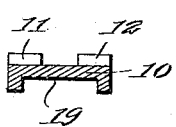

Figure 1 is a side elevation of an automobile with the emergency brake arranged thereupon; Fig. 2 is a rear elevation of an automobile as the same will appear with the brakes applied; Fig. 3 is a detail elevation of the cam-faced collar; Fig. 4 is a top plan view of one of the rear wheels of the vehicle with the emergency brake arranged adjacent thereto; Fig. 5 is a side elevation of the brake mechanism, the several shafts forming a part thereof being shown in section; Fig. 6 is a plan view of one of the brake shoes; Fig. 7 is a section on line 7—7 of Fig. 6; Fig. 8 is a detail perspective view of one of the foot levers; Fig. 9 is a top plan view of the lever arrangement employed for actuating the brake shoes; and Fig. 10 is a side elevation of one of the said levers.

Before proceeding with the description of the drawings I desire to call particular attention to the fact that while I have evolved my invention with particular reference to its application in connection with automobiles, the same may be readily utilized or arranged upon various types of vehicles susceptible of its application.

Referring now to the drawings, wherein is illustrated the preferred form of my invention the numeral 1 designates the automobile upon which the brake mechanism is arranged. The rear axle or power shaft 2 of the automobile is driven from the engine (not shown) in the usual manner, the said axle having wheels 3 arranged thereon by means of which motion is imparted to the machine. The brake mechanism comprising the invention being duplicate upon each side of the machine, the detail description of but one side will be set forth.

A large gear wheel 4 is loosely mounted upon the rear axle 2 of the machine between one side of the vehicle body and one of the rear wheels 3 of the machine, the said gear wheel having cam-faced projections 5 formed upon one face thereof adapted to engage a similar face 6 of a collar 7 keyed or otherwise rigidly secured to the rear axle 2 of the machine. The said wheel 4 being loosely mounted upon the rear axle 2 it will be seen that lateral movement may be imparted thereto by the operation of suitable lever mechanism to be hereinafter fully described. Upon the opposite side of the cam-faced collar 7 from that of the gear wheel 4 a small gear wheel 8 is loosely mounted, the said wheel 8 having cam-faced projections 9 formed upon the outer face thereof, the said projections adapted to engage or register with cam-faced recesses formed within the collar 7 upon the opposite side thereof from that of the recess 6 above-mentioned. Lateral movement of the wheel 8 is likewise controlled by the operation of the lever mechanism for sliding the said gear into and out of engagement with the collar 7.

A brake shoe or runner 10, arcuate or semicircular in form, is arranged adjacent the rear axle 2 and depends from the forward side thereof, the said shoe having a rack bar 11, the teeth of which are adapted to normally mesh with the teeth of the large gear wheel 4. A second rack 12 extending parallel with the rack 11 and in spaced relation thereto is formed upon the brake shoe 10 along the opposite edge thereof from that of the rack 11, the teeth of the rack 12 extending toward the top of the shoe a greater distance than the teeth of the rack 11, the said teeth adapted to normally mesh with a small gear wheel 13 mounted upon a stud shaft 14 and interposed between the small gear wheel and the said shoe, this arrangement being clearly illustrated in Fig. 5 of the drawings. Rollers 15 and 16 are respectively mounted upon stud shafts 17 and 18 projecting from the side of the vehicle body, the said rollers adapted to fit within a groove 19 formed within the brake shoe 10 upon the opposite face thereof from the rack bars 11 and 12 above described. By the provision of the said rollers it will be seen that the teeth of the said shoe are held in mesh with the gear wheeels 4 and 13 thereby allowing the said wheels to raise or lower the shoe in a manner to be hereinafter fully described, such movement of the shoe being limited by an enlarged extremity or head 20 formed upon the said shoe.

Annular grooves 21 are formed within the hubs of the gear wheels 4 and 8, the said grooves adapted to receive yokes 22 formed upon the extremities of the operating levers 23, the levers terminating at their rear extremities in lateral extensions 24 upon which the yokes 22 are formed thus permitting the manipulation of the levers to simultaneously operate the gear wheels arranged upon each side of the vehicle. The levers extend from the extensions 24 forwardly to a convenient point in the proximity of the operator's seat where they are secured to a bell crank lever 25 pivoted as at 26 to the floor of the vehicle body, the said lever 25 being in turn secured to a second bell crank lever 27 likewise pivoted as at 28 and provided with a foot rest or pedal 29 by means of which the said levers are operated.

Having described the detail construction of the brake mechanism of the operating means the operation of the same will now be fully set forth.

During the forward travel of the machine should it be found necessary, for any reason to apply the emergency brake, pressure upon the foot lever or pedal 29 will effect the desired result. By depressing the pedal 29 and the lever 27, the lever 25 is rocked upon its pivot causing the operating levers 23 to move laterally for swinging either of the gear wheels 4 or 8 into mesh or engagement with the collar 7 of the brake mechanism. By depressing the pedal of one of the operating levers 23 the large gear wheel 4 is laterally moved upon the rear axle 2 causing the cam-faced projection 5 to engage or mesh with the cam-faced recess 6 of the collar, the latter being rigidly mounted upon the driven axle 2 will impart motion to the large gear wheel 4 causing the brake shoe 10 to move downwardly by reason of the engagement between the teeth of the said larger gear wheel and the rack bar 11 of the said shoe. Such downward movement of the shoe is continued until the head 20 comes into engagement with the teeth of the gear wheel 4 at which time the teeth of the rack bar 11 will disengage the teeth of the gear wheel so that further downward movement of the shoe is prevented. The peculiar shape or arrangement of the shoe will cause the rear end of the machine to be elevated or raised above the ground or road over which the machine is traveling when the said shoe is forced into engagement with the ground, this engagement allowing the wheels 3 of the machine to freely rotate and the engine of the said machine to continue running as before without moving the machine. As the driven wheels of the machine are elevated by the engagement of the shoe with the ground, the weight of the machine which is partially supported by the said brake shoes will cause the same to drag over the road or ground thereby effecting a positive and efficient emergency brake. After the brakes have been applied as above set forth the operation of the other pedal will impart movement to the operating lever 23 causing the cam-faced projection 9 of the small gear wheel 8 to engage the cam-faced recess formed within the opposite face of the collar 7 from that within which the recesses 6 are formed. This engagement will impart rotary motion to the gear wheel 8 according to the rotation of the main axle 2 which will in turn rotate the small gear wheel 13 which is interposed between the said gear 8 and the rack bar 12 of the brake shoe. By interposing the gear wheel 13 as above described a reverse rotation to that of the main axle 2 is imparted to the said wheel thereby causing the brake shoe to be elevated or raised out of engagement with the ground. The teeth of the rack bar 12 extending upwardly upon the shoe 10 a greater distance than the teeth of the rack bar 11 will allow the teeth of the wheel 13 to mesh with the teeth of the rack bar 12 when the brake shoe is forced into its lowermost position, this arrangement causing the said shoe to again resume its normal elevated position by the reverse rotation imparted in the gear 13. The rollers 16 and 17 being arranged upon the opposite face of the brake shoe 10 from that of the gear wheels 4 and 13 will hold the said shoe into engagement with the said wheels, the groove 19 forming a rest or guide within which the said rollers are rotated during operation of the brake mechanism.

It will be seen from the above, taken in connection with the accompanying drawings that the emergency brake may be applied to the vehicle without in any way altering or affecting the operation of the motor by means of which the vehicle is run; that no strain or shock is transmitted to the running gear of the motor during the operation of the emergency brake; and that the entire brake mechanism is controlled from the driver's seat by the manipulation of the pedals and the lever arrangement employed in connection therewith.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. A vehicle emergency brake including a brake shoe, a collar rigidly mounted upon the driven axle of the vehicle adjacent the wheels upon which the said axle is supported, the said collar having cam-faced recesses formed therein, gears slidably mounted upon the said axle adapted to engage the said cam-faces of the collar, and means for operating the said gears for throwing the brake shoe into engagement with the ground for elevating the wheels and applying the emergency brake.

2. A vehicle emergency brake including a brake shoe, a collar rigidly mounted upon the driven axle of the vehicle, the said collar having cam-faced recesses formed therein, gear wheels slidably mounted upon the said axle, one gear wheel being disposed upon each side of the said collar and adapted to be slid into engagement with the said recesses and means including a plurality of levers arranged upon the vehicle for sliding the said gears into engagement with the said collar for actuating the brake shoe and throwing the same into engagement with the ground for elevating the wheels of the vehicle above the ground and applying the emergency brake.

3. A vehicle emergency brake including a brake shoe, gear mechanism arranged upon the driven axle of the vehicle adapted to actuate the said shoe, rollers arranged upon the vehicle adapted to support the said shoe in engagement with the said gear mechanism, and means including a plurality of levers carried by the vehicle, the operation of which will throw the said brake shoe into engagement with the ground and elevate the driven wheels of the vehicle.

4. A vehicle emergency brake including a brake shoe, a collar rigidly mounted upon the driven axle of the said vehicle adjacent the supporting wheels thereof, the said collar having cam-faced recesses formed therein, gear wheels slidably mounted upon the said axle, one wheel being disposed upon each side of the said collar, cam-faced projections carried by the said gear wheels adapted to be slid into engagement with the cam-faced recesses of the said collar for imparting motion to the said wheels according to the rotation of the driven axle, and means including a plurality of levers arranged upon the vehicle body adapted to slide the said gear wheels for throwing the brake shoe into engagement with the ground and elevating the wheels out of engagement therewith.

5. A vehicle emergency brake including a brake shoe, a collar rigidly mounted upon the driven axle of the vehicle, gear wheels slidably mounted upon the said axle one upon each side of the said collar, means carried by the said gear wheels adapted to engage the said collar for imparting motion to the former according to the rotation of the axle, an intermediate gear wheel arranged between one of the said first mentioned gear wheels and the brake shoe and means including a plurality of levers arranged upon the vehicle body adapted to slide the said first mentioned gear wheels for actuating the brake shoe and applying the emergency brake.

6. A vehicle emergency brake including a curved brake shoe having rack bars formed thereupon, a collar rigidly mounted upon the driven axle of the vehicle adjacent the wheels thereof, gear wheels slidably mounted upon the said axle one upon each side of the said collar, means carried by the said gear wheels adapted to engage the said collar for imparting motion to the said wheels according to the rotation of the said axle, one of the said gear wheels adapted to mesh into one of the rack bars of the said brake shoe, an intermediate gear interposed between the other of the said first mentioned gears and the other rack bar of the brake shoe, and means including a plurality of levers arranged upon the vehicle body adapted to slide the said gears for throwing the brake shoe into engagement with the ground and elevating the driven wheels of the vehicle.

7. A vehicle emergency brake including a brake shoe having a pair of parallel rack bars formed thereupon, a collar rigidly mounted upon the driven axle of the vehicle adjacent the wheels thereof, the said collar having cam-faced recesses formed upon each side thereof, gear wheels slidably mounted upon the said axle one upon each side of the said collar, cam-faced projections formed upon the said wheels adapted to engage the said recesses of the collar for imparting motion to the said wheels according to the rotation of the said axle, one of the said gear wheels adapted to engage one of the rack bars of the said brake shoe, for sliding the latter into engagement with the ground, an intermediate gear wheel interposed between the other of the said first mentioned gears and the other of the rack bars of the brake shoe for sliding the said brake shoe out of engagement with the ground, rollers carried by the said vehicle adapted to fit within a guide groove formed within the said brake shoe upon the opposite face thereof from that of the rack bars for holding the said rack bars in mesh with the said gear wheels, and means including a plurality of levers arranged upon the vehicle body for alternately sliding the said first mentioned gear wheels into engagement with the said collar for applying the emergency brake, as and for the purpose set forth.

8. In a vehicle emergency brake, the combination with brake shoes, gear wheels having annular grooves in their hubs and being slidably mounted on the vehicle axle, and a collar having cam faces, of a pair of operating levers for imparting motion to the said gear wheels, said levers having at one extremity cross pieces terminating in yokes adapted to engage in the annular grooves in the gear wheel hubs, one of said cross pieces being somewhat shorter in length than the other, the opposite extremities being connected to series of bell crank levers, as and for the purpose described.

In testimony whereof I affix my signature in presence of two witnesses.

GEORGE W. CASSIL.

Witnesses:
LEE ARNOLD,
FRANK D. MILLER.

Copies of this patent may be obtained for five cents each, by addressing the "Commissioner of Patents, Washington, D. C."